Dec. 5, 1939.  A. A. CABASSA  2,182,423
SALT WATER ROD AND REEL
Filed June 11, 1938
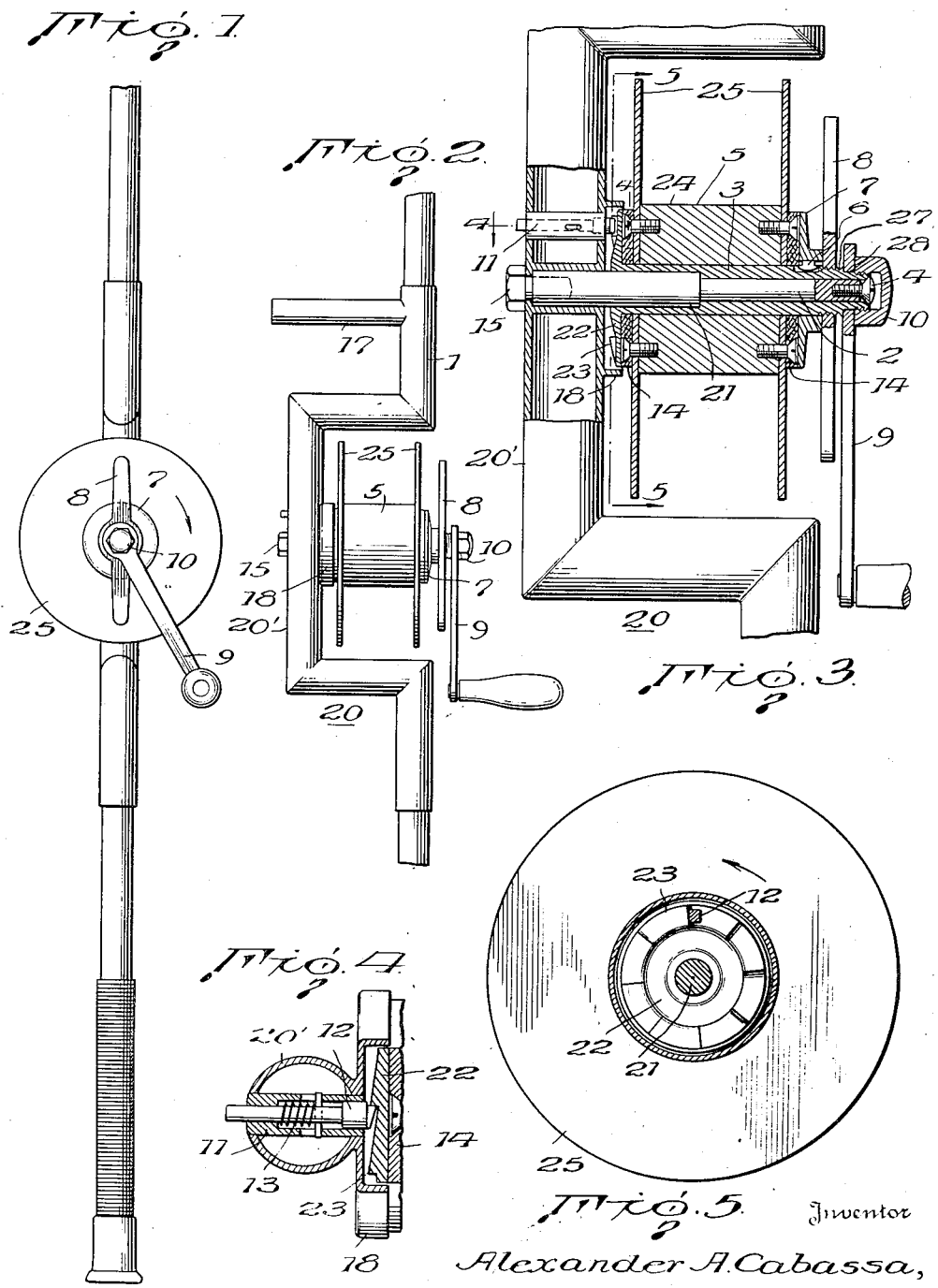
Inventor
Alexander A. Cabassa Patented Dec. 5, 1939

2,182,423

UNITED STATES PATENT OFFICE 2,182,423

SALT WATER ROD AND REEL

Alexander A. Cabassa, Lakeland, Fla.

Application June 11, 1938, Serial No. 213,172

1 Claim. (Cl. 43—20)

This invention relates to an improvement in a combined rod and reel particularly adaptable for salt water fishing.

The invention consists in providing the handle portion of the rod with an offset portion within which a reel is positioned. The axle or shaft for the reel is mounted upon the offset portion of the rod so that the horizontal axis of the reel is in alinement with the longitudinal axis of the rod. The reel is loosely journaled upon the axle and is provided with a ratchet which cooperates with a spring actuated pawl carried by the offset portion of the rod which allows the reel to be rotated clockwise by a handle mounted on the axle, yet permitting the reel to rotate freely counterclockwise.

The invention consists of certain novel features of construction and combinations of parts which will be hereinafter described and pointed out in the appended claim:

In the accompanying drawing:

Fig. 1 is a view in top plan showing the reel applied to the handle portion of the rod;

Fig. 2 is a view in side elevation;

Fig. 3 is a transverse horizontal sectional view of the rod and reel;

Figure 4 is a detail sectional view on line 4—4 of Figure 3; and Figure 5 is a transverse vertical sectional view on line 5—5 of Figure 3.

The handle portion 1 of the rod or pole is provided at a suitable distance from the butt end thereof with a lateral offset or recessed portion of a size sufficient to encompass at least three sides of a reel. In the present construction, the offset portion 20 is formed of a metal tube, which is bent between its ends to produce a substantially U-shaped recessed portion which lies at right angles to the end portions. The end portions are adapted to telescope with other sections of a rod or pole in providing a complete rod or pole.

Connected to the central portion 20' of the offset portion 20, which extends parallel to the ends thereof, is an axle or shaft 2. The shaft 2 is provided with an enlarged cylindrical portion 21 adjacent one end thereof which engages the central portion of the offset, and the end of the shaft extending through the central portion is attached thereto by a nut 15 screwed onto the end of the shaft.

A sleeve 3 is mounted on the shaft 2, and is provided with a stepped bore to conform to the contour of the shaft, so that one portion of the bore receives the enlarged portion 21 of the shaft to limit the longitudinal movement of the sleeve on the shaft. A flange 22 is formed on an end of the sleeve 3 and is provided on its outer face with a row of ratchet teeth 23 along the peripheral edge thereof. The flange 22 and teeth 23 are maintained in spaced relation with respect to the rod 1 by the enlarged portion 21 of the shaft. A screw 4 has screw-threaded engagement with the end of the shaft 2 for retaining the sleeve thereon.

Mounted to rotate on the sleeve 3 is a spool 5, which is of the usual construction comprising a hub 24 and side flanges or disks 25. The inner face of the flange 22 of the sleeve 3 engages with a suitable friction material 14 on disk 25 of the spool 5. A disk flange 7, is keyed to the sleeve 3 by a Woodruff key 6, and engages friction material 14 on the other disk 25 of the spool 5 for retaining the spool on the sleeve.

The free end of the sleeve is screw-threaded at 27 for the reception of a wing nut 8, which may be adjusted on the sleeve for braking the rotation of the spool on the sleeve in accordance with the pressure created in bringing the friction material 14 of the disks 25 in contact with the flanges 7 and 22.

The sleeve 3 is provided with a squared portion 28 for the reception of a crank 9, and a cap nut 10 is screwed onto the end of the sleeve for fastening the crank thereto.

A tubular member 11 extends through the portion 20' of the rod 1 in parallel relation to the shaft 2, and is provided with a pawl 12 which reciprocates within the tubular member. The pawl is urged into engagement with the teeth of the ratchet 23 by means of a spring 13 confined within the tubular member 11, for limiting the rotation of the sleeve only, in a clockwise direction upon the turning of the crank 9.

A housing 18 is carried by the portion 20' of the rod 1 and extends over the flange 22 for enclosing the ratchet 23 and pawl 12.

From the foregoing it will be apparent that the spool 5 of the reel is capable of free rotation in a clockwise and counter-clockwise direction, and the freedom of its movement is restricted by the tension or pressure imposed on the disks 25 thereof and the friction material 14 by the flanges 7 and 22 of the sleeve 3, as the brake or wing nut 8 is screwed along the sleeve 3. Therefore the line may be payed out in accordance with the tension or pressure that is applied by the brake or nut 8. However, when it is desired to reel in the line, the crank 9 is turned thereby causing the sleeve 3 to be rotated, and rotation will be imparted to the spool 5 in accordance with the tension that has been applied by the brake 8 in drawing the flanges 7 and 22 of the sleeve into engagement with the disks 25 of the spool.

In reeling in a line, and particularly in catching game fish, it is difficult to keep the rod or pole from twisting or turning in the hand of the operator, and to overcome this objection a lateral extension 17 is formed on the rod 1 in advance of the reel and offset portion which when grasped by the left hand of the operator permits the holding of the rod or pole rigid during the reeling operation and at the same time permits the operator to manipulate the rod to suit the demands.

By providing the extension or hand hold 17 and the offset portion in the rod 1 a more perfectly balanced rod is obtained, as the reel is positioned with its axle lying in the longitudinal axis of the rod thereby greatly eliminating the possibility of the rod to twist in the hand, and with the hand hold 17 beyond the reel additional provision is afforded in overcoming the objection common with combined rods and reels of this character.

I claim:

The combination of a fishing rod having an offset recessed portion adjacent one end thereof, a shaft carried by said offset portion, a sleeve journalled on said shaft, a reel spool freely rotatable on said sleeve, flanges on said sleeve for engaging said spool, means on said sleeve for adjusting the position of said flanges with respect to said spool for governing the rotation of the spool on the sleeve, means on said sleeve for rotating the sleeve and spool in a clockwise direction, ratchet teeth on one of the flanges of the sleeve, a pawl mounted on the rod for engaging the teeth of the flange for preventing the flange and sleeve from rotating in a counterclockwise direction, and means for locking the sleeve on the shaft against longitudinal movement.

A. A. CABASSA.